United States Patent [19]

Hayashi et al.

[11] Patent Number: 4,814,038
[45] Date of Patent: Mar. 21, 1989

[54] SINGLE FACER MACHINE HAVING WEB CHANGE CAPABILITY

[75] Inventors: Tamotsu Hayashi; Ryoichi Takekawa; Hiromi Watanabe, all of Kasugai, Japan

[73] Assignee: Isowa Industry Co., Ltd., Aichi, Japan

[21] Appl. No.: 24,416

[22] Filed: Mar. 11, 1987

[30] Foreign Application Priority Data

Mar. 17, 1986 [JP] Japan .................................. 61-58881

[51] Int. Cl.⁴ .................................................. B31F 1/24
[52] U.S. Cl. ...................................... 156/471; 156/472
[58] Field of Search .............................. 156/470-474, 156/555, 504

[56] References Cited

U.S. PATENT DOCUMENTS

| | | | |
|---|---|---|---|
| 1,180,828 | 4/1916 | Crane | 156/472 |
| 1,264,506 | 4/1918 | Hahn | 156/473 |
| 2,710,044 | 6/1955 | Bruker | 156/473 |
| 3,398,911 | 8/1968 | Poupin | 242/58.4 |
| 3,455,767 | 7/1969 | Meister | 156/470 |
| 3,707,909 | 1/1973 | Volkers | 156/473 |
| 3,738,896 | 6/1973 | Sornichsen | 156/470 |
| 4,569,714 | 2/1986 | Tokuno | 156/474 |
| 4,620,896 | 11/1986 | Sueki et al. | 156/205 X |
| 4,627,831 | 12/1986 | Hirkawa et al. | 156/472 |
| 4,631,109 | 12/1986 | Hirkawa et al. | 156/472 |
| 4,738,744 | 4/1988 | Saller | 156/473 X |

FOREIGN PATENT DOCUMENTS 1538604  9/1967  France ................................ 156/471

*Primary Examiner*—David Simmons
*Attorney, Agent, or Firm*—Koda and Androlia

[57] ABSTRACT

A single facer machine is disclosed which comprises a first corrugating unit having a pair of upper and lower rolls, a second corrugating unit also having a pair of upper and lower rollw, and a common pressure roll disposed in operative association with both the first corrugating unit and the second corrugating unit. The single facer machine is characterized in that either of the combination of the first corrugating unit and the pressure roll or the combination of the second corrugating unit and the pressure roll is selectively operated to form a single-faced corrugated board.

8 Claims, 12 Drawing Sheets

SINGLE FACER MACHINE HAVING WEB CHANGE CAPABILITY

BACKGROUND OF THE INVENTION

1. Field of the Invention

The present invention relates to a single facer machine which is capable of selectively manufacturing single-faced corrugated boards having different kinds of flute.

2. Description of the Prior Art

As shown in FIG. 1, a single facer machine includes an upper roll 10, a lower roll 12 and a pressure roll 14 all supported by side frames (not shown) for rotation about a horizontal axis. The upper roll 10 and the lower roll 12 both have axially extending corrugations formed on the entire periphery thereof, and are supported by the side frames in such a manner as to mesh with each other at the respective corrugations. The pressure roll 14 is so constructed to be pressed against the lower roll 12 through a web of medium 16 and a linerboard 18. The medium 16 is fed into and passed between the upper roll 10 and the lower roll 12 where flutes are formed under pressure. The ridges or tips of the flutes are coated with glue by means of an adhesive applicator roll 22 of a glue mechanism 20. The linerboard 18, which is fed from a direction opposite to the medium 16, passes over the pressure roll 14 and into the nip between the upper and lower rolls 12 and 14, and is adhesively bonded to the flute tips of the medium 16 to thereby form a single-faced corrugated board 24.

It is to be noted that the single-faced corrugated boards 24 may be classified according to the height and the number of flutes per 30 cm formed on a web of medium 16: A-flute, B-flute, C-flute, D-flute, and E-flute. The kind of flute depends upon the corrugated configuration of the upper and lower rolls to be mounted on the machine.

As mentioned above, plural kinds of flute are available to form a single-faced corrugated board, and the kind of flute depends upon the corrugated configuration of the upper and lower rolls incorporated in the single facer machine. Thus, in order to form single-faced corrugated boards with different kinds of flute by one set of single facer machine, the upper and lower rolls of the machine have to be bodily replaced each time the kind of flute is changed. The roll replacement, however, requires complicated labor and considerable time. In addition, the combination of flute kinds of single-faced corrugated boards to be selectively produced is not random, and certain combinations are formed, for example; A-flute and E-flute, B-flute and E-flute, and C-flute and E-flute. Thus, the prior art has heretofore employed two sets of single facer machine juxtaposed in a single corrugator line, wherein the machines are selectively operated to produce two kinds of single-faced corrugated board within the range of certain combinations as described above.

Two general systems, the tandem system and the double-decker system, are known in the prior art for arranging two sets of single facer machine in a single corrugator line. The tandem system includes two sets of single facer machine arranged one behind the other or disposed in series in a corrugator line. The double-decker system includes two sets of single facer machine laid one on the other or arranged on two overlying decks. Either of the systems is selectively employed depending on the installation space available in each individual manufacturing plant.

Basically, in each of the two systems, the installation cost will inevitably be doubled because of the two sets of single facer machine arranged in a single corrugator line. In addition, the systems involve the following disadvantages in relation to installation area, efficiency of operation, and incidental equipment.

(1) In the tandem system, since two sets of single facer machine having entirely the same machine structure are arranged in series, additional installation area for at least one set of single facer machine is required and the space available in the plant may not be effectively utilized.

(2) In the double-decker system, apparently installation area for one set of machine will suffice, but the efficiency of operation of the upper machine will greatly be reduced because of two sets of single facer machine arranged one on the other.

(3) These systems require each two sets of power transmitting mechanisms such as speed reducers, of machine frames, and of pipings for steam and hydraulic/pneumatic systems. Also, the systems require each two sets of incidental equipment such as preheaters and take-up conveyors for transferring single-faced corrugated boards produced by the machines.

(4) The systems require each two sets of motors, and electric control systems such as control panels and consoles.

Japanese Laid-Open Patent Publication No. 54-143384 discloses an improved single facer machine which eliminates certain disadvantages associated with the prior art. As shown in FIG. 4 of the publication, the single facer machine includes dual pairs of upper and lower rolls journalled on a suspension member 30. The suspension member 30 is pivoted about a fixed shaft 31, thereby selectively bringing one pair of upper and lower rolls into contact with a pressure roll 34. However, the pair of upper and lower rolls are inherently very heavy and hence, in order to rotate the suspension member 30, which has the dual pairs of upper and lower rolls, for substantially 180 degrees to thereby alternately shift each pair of upper and lower rolls, extremely large-scaled drive mechanisms and support mechanisms are needed. Further, in order to stop the suspension member 30 in place, a high degree of positioning accuracy is required. All of these factors significantly add to the manufacturing cost.

SUMMARY OF THE INVENTION

It is, accordingly, an object of the present invention to provide an improved single facer machine wherein the foregoing difficulties and disadvantages are substantially eliminated.

It is another object of the present invention to provide a single facer machine especially adapted to form single-faced corrugated boards having different kinds of flute without requiring a large installation area and yet with increased efficiency of operation.

It is a further object of the present invention to reduce the manufacturing cost by providing an improved single facer machine which requires only each one set of pipings for steam and hydraulic/pneumatic systems, of mechanical equipment such as power transmitting systems, and of electrical equipment such as control panels, unlike the prior art wherein two sets of such equipment have been required.

To overcome the problems of the prior art and to achieve the foregoing objects, the present invention provides a single facer machine which comprises a first corrugating unit having a pair of upper and lower rolls, a second corrugating unit also having a pair of upper and lower rolls, and a common pressure roll disposed in operative association with both the first corrugating unit and the second corrugating unit, characterized in that either of the combination of the first corrugating unit and the pressure roll or the combination of the second corrugating unit and the pressure roll is selectively operated to form a single-faced corrugated board.

The present invention will become more fully apparent from the claims and description as it proceeds in connection with the drawings.

DETAILED DESCRIPTION OF THE PREFERRED EMBODIMENTS

Figure 1:
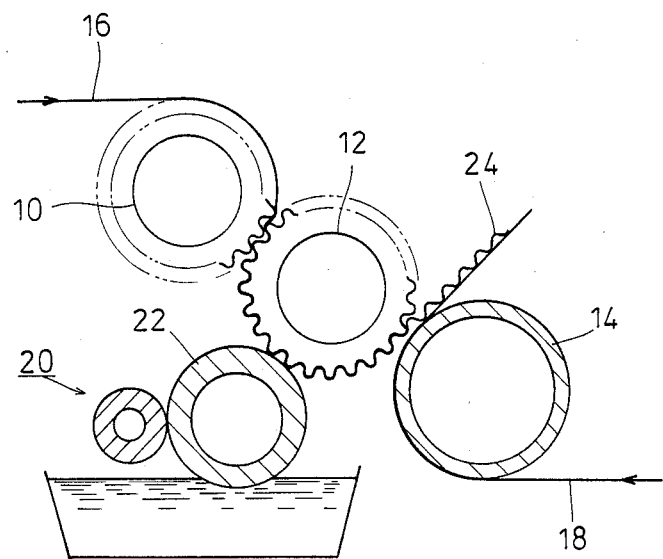
FIG. 1 is a diagrammatical view showing the general arrangement of a conventional single facer machine.
Figure 2:
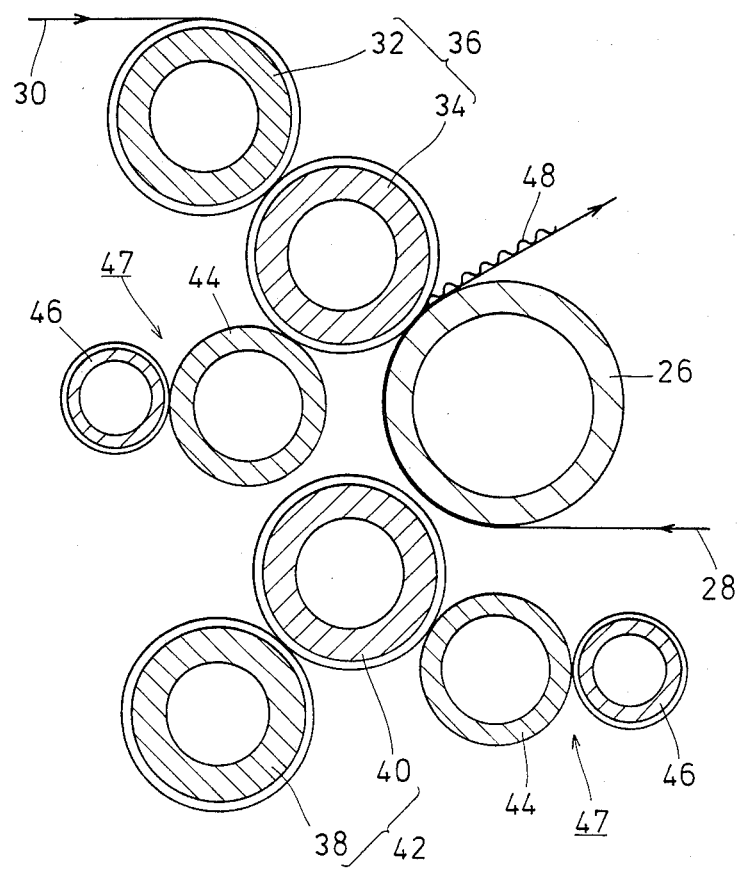
FIG. 2 is a diagrammatical view of the general arrangement of a single facer machine according to a preferred embodiment of the present invention, showing the combination of a first corrugating unit and a pressure roll in an operative position to form a single-faced corrugated board, and showing a second corrugating unit in an inactive position or on standby.

Referring to the drawings and to FIG. 2 in particular, shown therein is the general arrangement of a single facer machine constructed in accordance with the invention. Reference numeral 26 designates a pressure roll for guiding and pressing a linerboard 28 against the flute tips of a web of medium 30 to which adhesive has been applied. Disposed obliquely upwardly of the pressure roll 26 is a first corrugating unit 36 which consists of a pair of upper and lower rolls 32 and 34. In addition, disposed obliquely downwardly of the pressure roll 26 is a second corrugating unit 42 which consists of a pair of upper and lower rolls 38 and 40. It will be noted that the kind of flute of the first corrugating unit 36 and the kind of flute of the second corrugating unit 42 are assorted in a predetermined manner; for example, A-flute and E-flute, B-flute and E-flute, and C-flute and E-flute.

Disposed adjacent to the first corrugating unit 36 and the second corrugating unit 42 are glue mechanisms 47, respectively, each of which comprises an adhesive applicator roll 44 and a doctor roll 46. Here, it should be noted that upper and lower rolls are not in relation to the relative upper and lower positions thereof; the rolls which are pressed against the pressure roll 26 through the linerboard 28 and the medium 30 are referred to as the "lower rolls".

In the basic arrangement thus constructed, the pressure roll 26 is alternately associated with the first corrugating unit 36 or the second corrugating unit 42. A single-faced corrugated board 48 is formed either by the combination of the pressure roll 26 and the lower roll 34 of the first corrugating unit 36 or by the combination of the pressure roll 26 and the lower roll 40 of the second corrugating unit 42. Thus, the pressure roll 26 is used common to the first corrugating unit 36 and the second corrugating unit 42. The two combinations as described above may be formed by the following two arrangements: (1) the arrangement in which the pressure roll 26 is movable, and (2) the arrangement in which the first and the second corrugating units 36 and 42 are movable. The present invention is adaptable for both arrangements.

Figure 4:
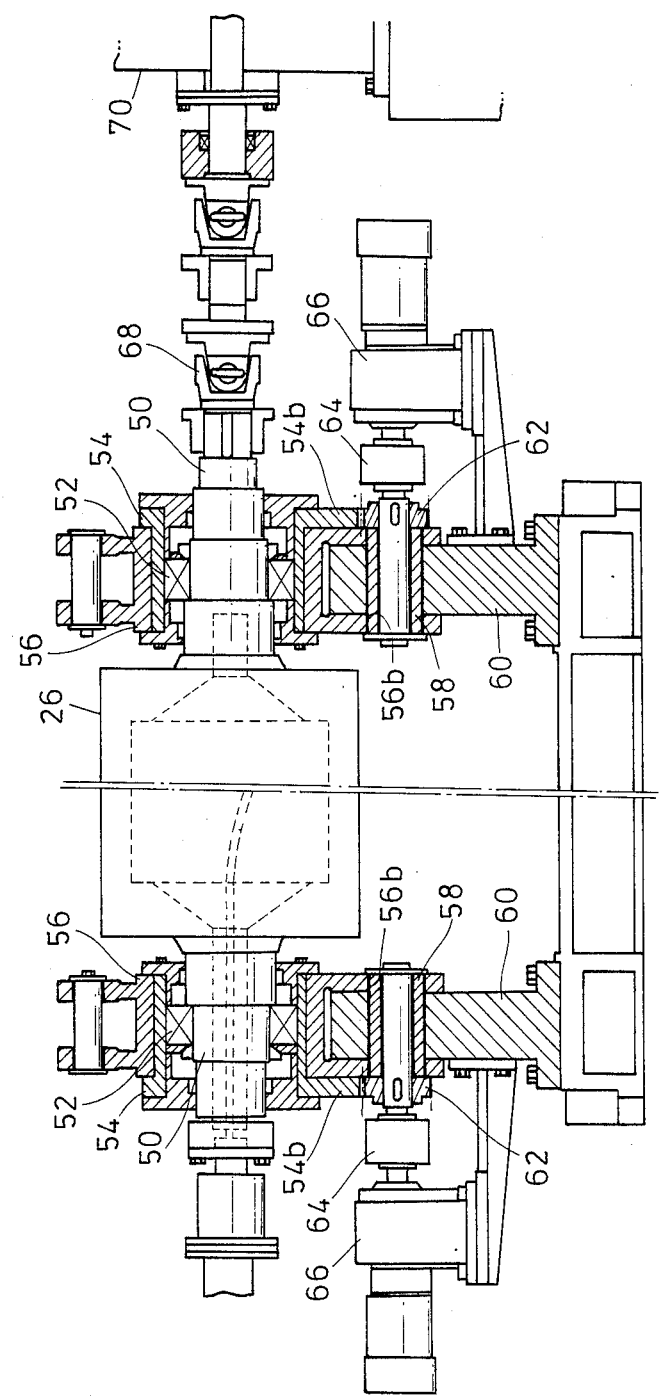
FIG. 4 is a schematic sectional view showing a mechanism for selectively shift the pressure roll to the first corrugating unit or the second corrugating unit in the single facer machine of FIG. 2.
Figure 5:
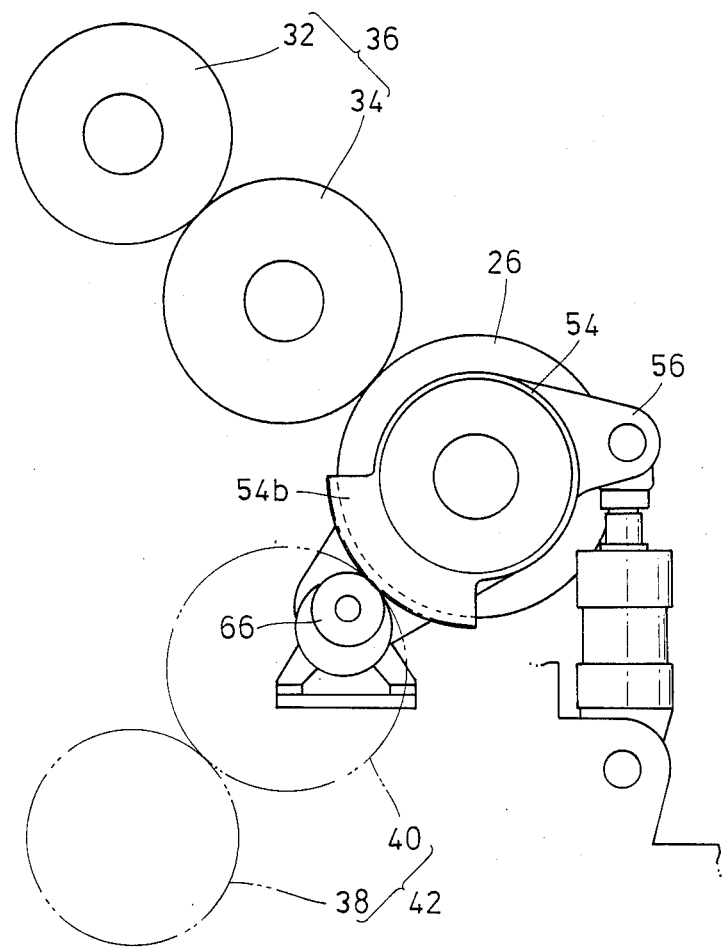
FIG. 5 is a side view illustrating the general arrangement of the component parts of the mechanism shown in FIG. 4.
Figure 7:
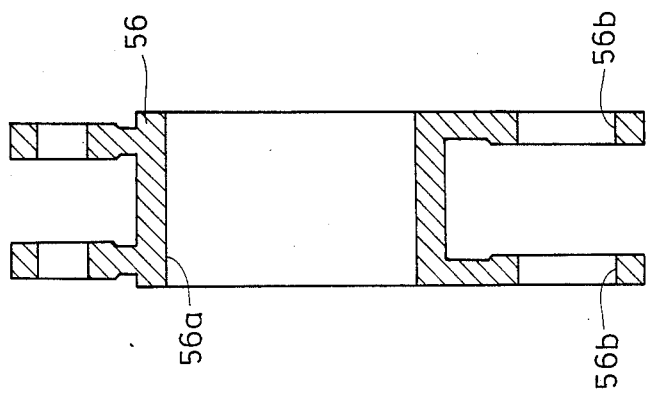
FIG. 7 is a sectional view taken along the line VII—VII of FIG. 6.
Figure 6:
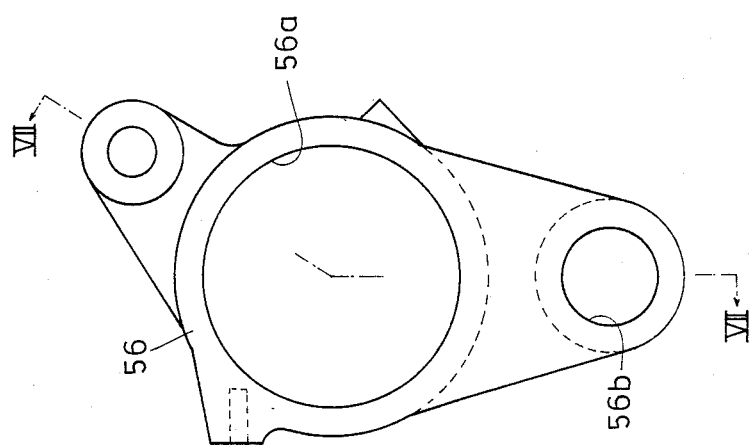
FIG. 6 is a front view of a lever used in the mechanism shown in FIG. 4.
Figure 9:
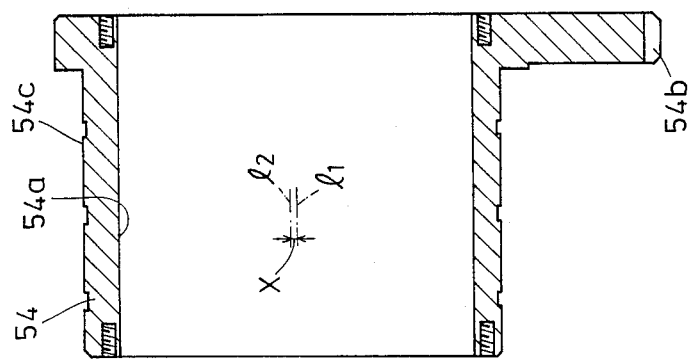
FIG. 9 is a sectional view taken along the line IX—IX of FIG. 8.
Figure 8:
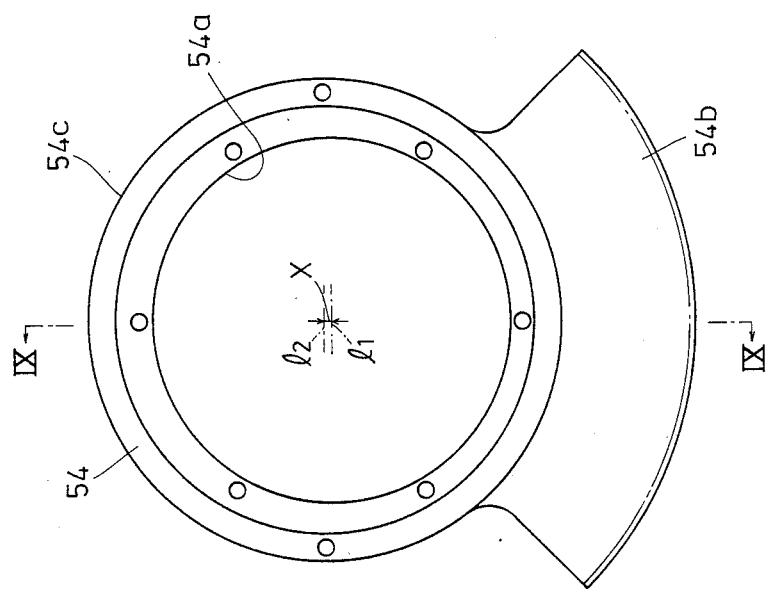
FIG. 8 is a front view of an eccentric race used in the mechanism of FIG. 4 and adapted for insertion into a through hole of the lever of FIG. 6.

FIGS. 4 and 5 show an embodiment of the arrangement in which the pressure roll 26 is movable. With reference to FIG. 4 in particular, the mechanism for moving the pressure roll 26 is seen to consist of each two component parts except elements 68 and 70. Therefore, for purposes of illustration, reference will hereinafter made to only one part. The pressure roll 26 includes a rotary shaft 50 rotatably carried by a bearing 52. The bearing 52 is fitted in a through hole 54a of a race 54 shown in FIG. 8. The race 54 is fitted in a through hole 56a of a lever 56 shown in FIG. 6. The lever 56 has formed at one end thereof a support hole 56b in which a hollow pin 58 is inserted. The hollow pin 58 is fixed in a frame 60 so that the lever 56 is pivotally supported by the frame 60. As shown in FIGS. 8 and 9 the race 54 has a sector gear 54b formed integrally with one peripheral portion thereof. It is important to note the center 11 of the through hole 54a is displaced a desired distance X from the center 12 of the race peripheral surface 54c. For this reason, as may be seen in FIG. 9, the thickness of the race 54 is irregular.

As shown in FIG. 4, the sector gear 54b, which is supported by the frame 60 through the hollow pin 58, meshes with a pinion gear 62 rotatably carried in the hole of the hollow pin 58. The pinion gear 62 is operatively connected to a speed reducer 66 through a universal joint 64. The rotary shaft 50 of the pressure roll 26 is operatively connected to another speed reducer 70 through a universal joint 68 so that a desired rotational movement may be imparted to the pressure roll 26. Since the pressure roll 26 moves eccentrically as will hereinafter be described, the universal joint 68 is preferably of heavy-load type which has a spline shaft and which provides a greater universal angle.

Figure 3:
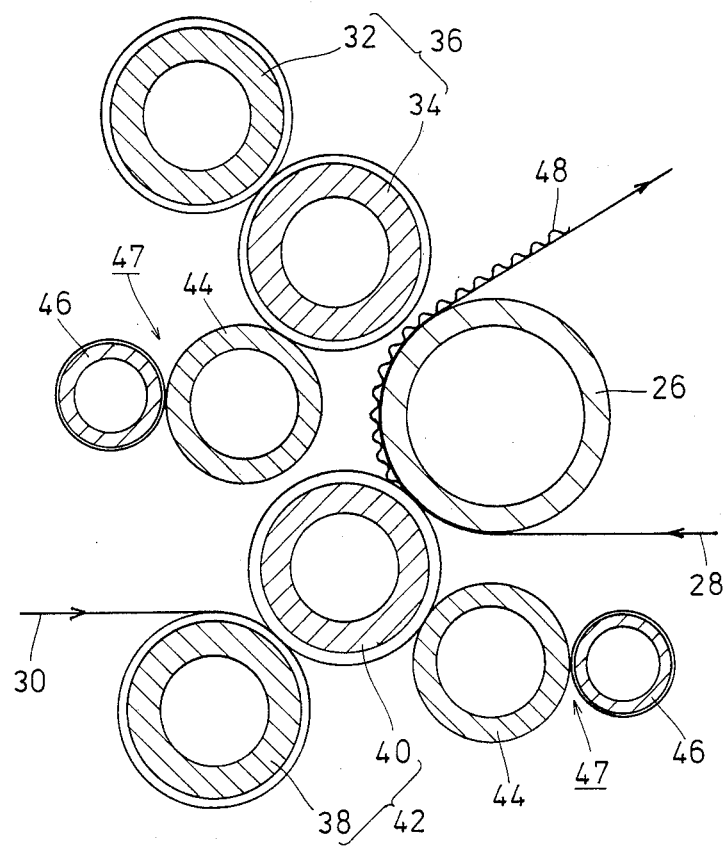
FIG. 3 is a diagrammatical view similar to that of FIG. 2, showing the combination of the second corrugating unit and the pressure roll in an operative position to form a single-faced corrugated board, and showing the first corrugating unit in an inactive position or on standby.

With this arrangement, when the speed reducers 66 are driven to rotate the pinion gears 62, the sector gears 54b which mesh with the pinion gears 62 are rotated together with the races 54 supported by the levers 56. At this time, the center 12 of the peripheral surface 54c of each race 54 on which the sector gear 54b is formed, is deviated a desired distance from the center 11 of each through hole 54a, and therefore, as the races 54 are rotated, the pressure roll 26 moves eccentrically. Thus, it can be appreciated that amount of eccentricity X in the through hole 54a of the race 54 may be designed to shift between a first position in which the pressure roll 26 contacts the lower roll 34 of the first corrugating unit 36, as shown in FIG. 2, and a second position in which the pressure roll 26 contacts the lower roll 40 of the second corrugating unit 42, as shown in FIG. 3. The pressure roll 26 may then be selectively shifted to contact either the lower roll 34 of the first corrugating unit 36 or the lower roll 40 of the second corrugating unit 42. Here, it will be noted that the first corrugating unit 36 and the second corrugating unit 42 are both in their fixed position.

Figure 10:
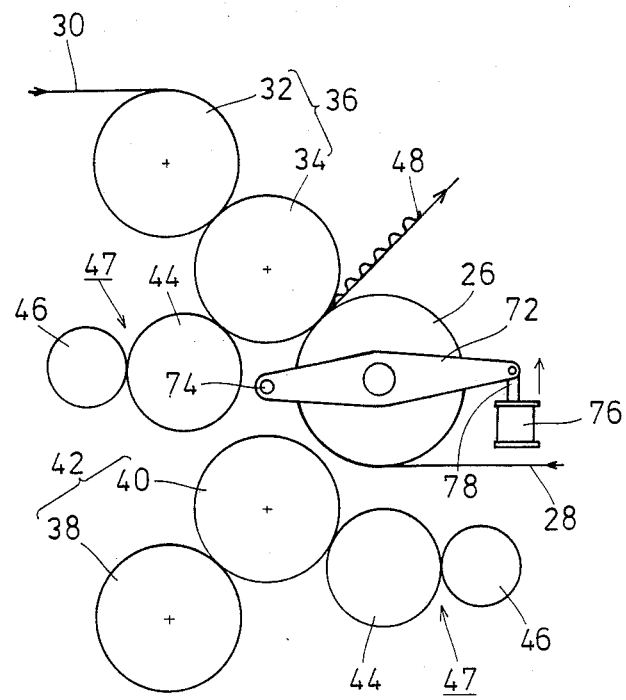
FIGS. 10A and 10B are diagrammatical views showing a modified mechanism for shifting the pressure roll according to the invention to the embodiment of FIGS. 2 and 3.
Figure 10:
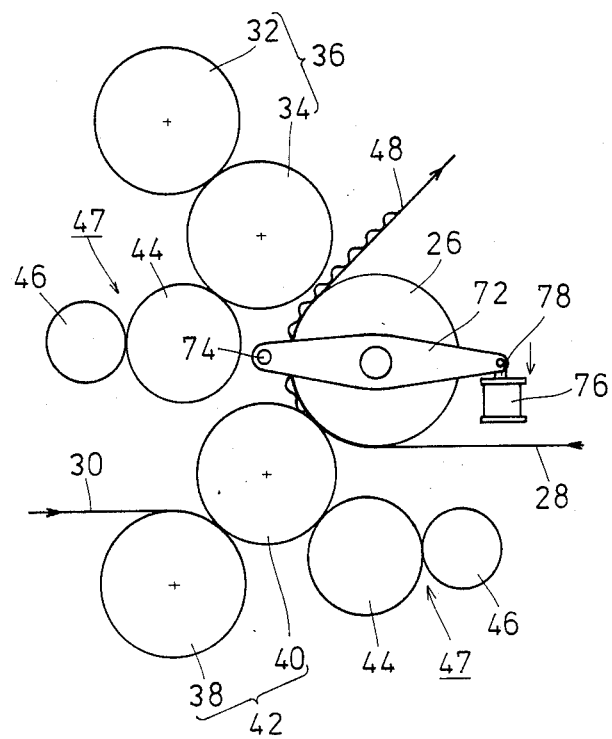

FIGS. 10A and 10B show a modification of the mechanism for selectively shifting the pressure roll 26 relative to the first corrugating unit 36 and the second corrugating unit 42. In this modified arrangement, the pressure roll 26 is rotatably supported by a lever 72 at its medial portion. One end of the lever 72 is pivotally connected through a pin 74 to a fixed structure (not shown) such as a frame. The other end of the lever 72 is connected to a piston rod 78 of a hydraulic cylinder 76, so that the lever 72 is actuated to pivot about the pin 74. Thus, when the hydraulic cylinder 76 is actuated to thereby lift the piston rod 78, the pressure roll 26 is brought into contact with the lower roll 34 of the first corrugating unit 36. Conversely, when the hydraulic cylinder 76 is deactuated to thereby lower the piston rod 78, the pressure roll 26 is brought into contact with the lower roll 40 of the second corrugating unit 42, as shown in FIG. 10B.

Figure 11:
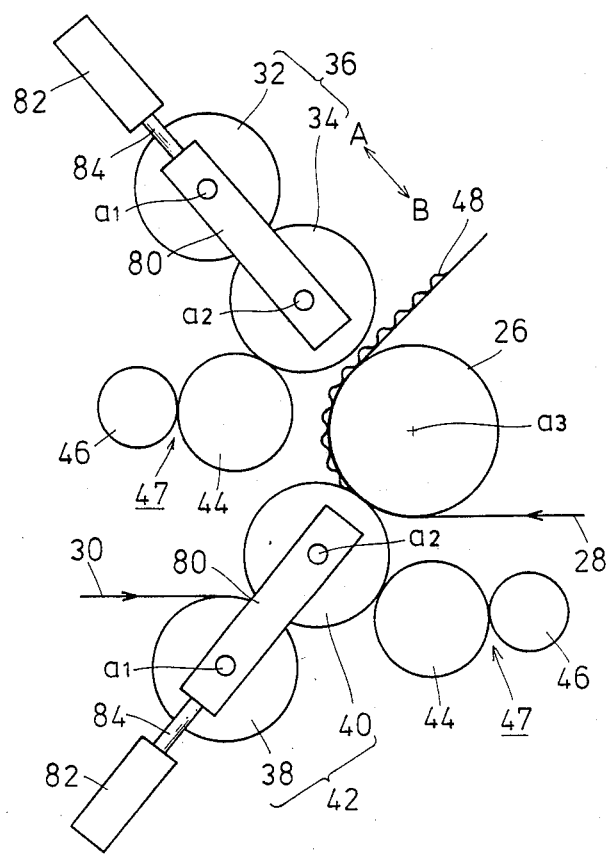
FIGS. 11A and 11B are diagrammatical views of the general arrangement of a single facer machine according to another embodiment of the present invention.
Figure 11:
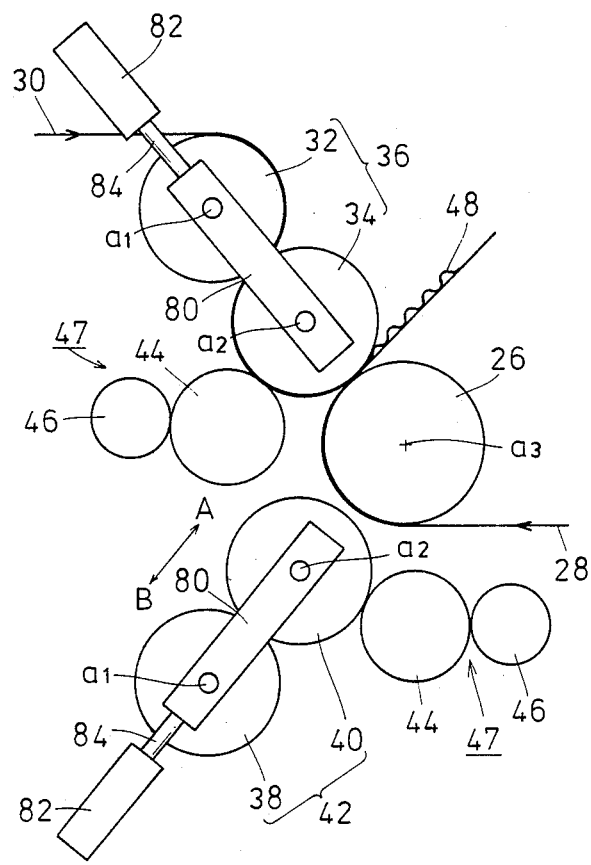

FIGS. 11A and 11B show another embodiment of the single facer machine of the invention. Basically, the first corrugating unit 36 and the second corrugating unit 42 may be selectively moved toward and away from the pressure roll 26 which is located in a fixed position. Preferably, the arrangement of the first corrugating unit 36 and the second corrugating unit 42 is such that a straight line connecting the centers a1 and a2, respectively, of the upper and lower rolls is linearly moved toward and away from the center a3 of the pressure roll 26. To this end, for example, the upper roll 32 and lower roll 34 of the first corrugating unit 36 are supported by a common bracket 80. The bracket 80 is connected to a piston rod 84 of a hydraulic cylinder 82 mounted on the frame (not shown). Upon actuation of the cylinder 82, the rolls 32 and 34 may be linearly moved toward and away from the axis a3 of the pressure roll 26.

Figure 12:
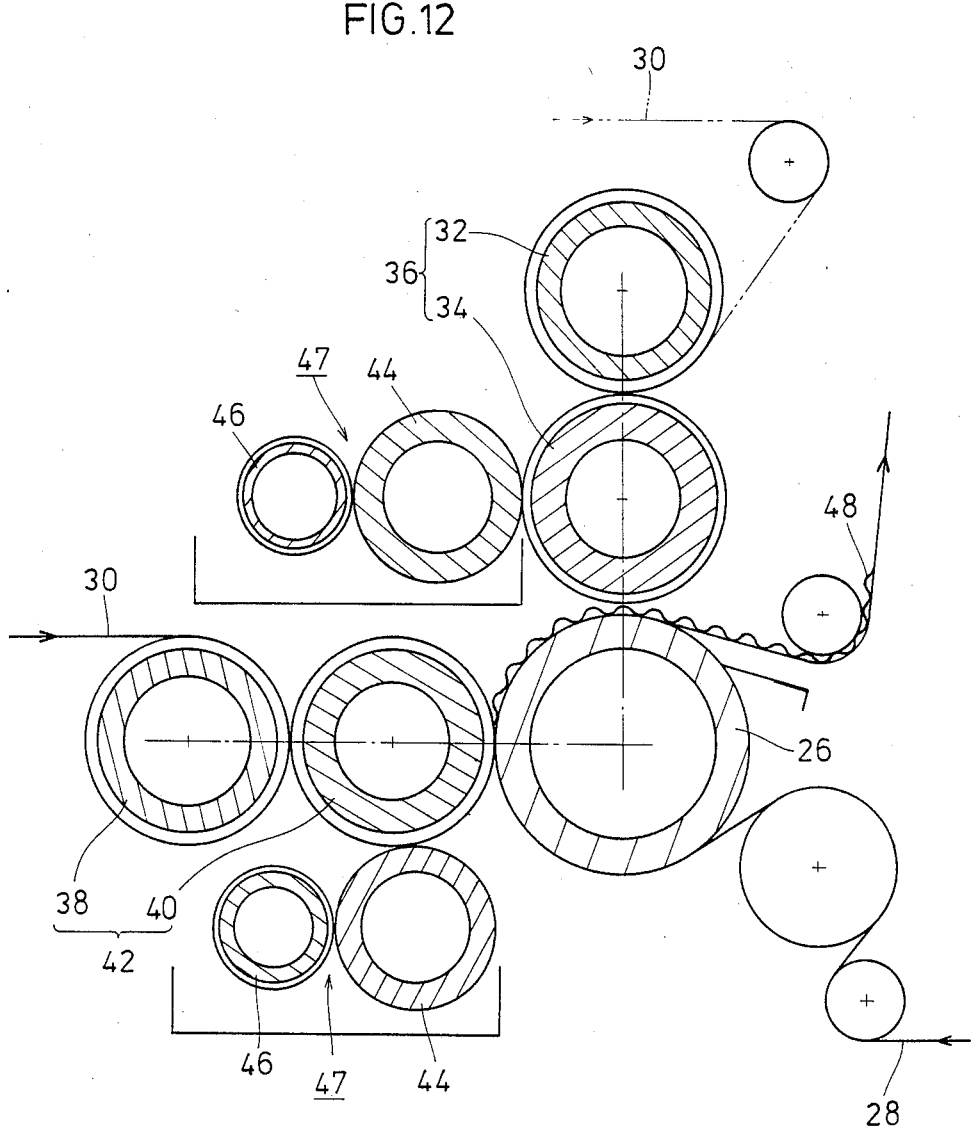
FIG. 12 is a diagrammatical view showing a modified arrangement of the first and the second corrugating units according to the invention to the embodiment of FIGS. 2 and 3.

FIG. 12 shows a modified arrangement of the first and the second corrugating units 36 and 42 shown in FIGS. 2 and 3. As may be seen, the axes of rotation of the upper roll 32 and lower roll 34 forming the first corrugating unit 36 are located directly above the axis of rotation of the pressure roll 26. Also, the axes of rotation of the upper roll 38 and the lower roll 40 forming the second corrugating unit 42 lie in a horizontal plane extending directly leftwardly of the axis of rotation of the pressure roll 26.

By means of this roll arrangement, the glue mechanism 47 associated with the second corrugating unit 42 may be located directly below the lower roll 40 of the second corrugating unit 42. This means that the glue mechanism 47 and the other glue mechanism 47 associated with the first corrugating unit 36 may be located on the same side relative to the pressure roll 26, thereby providing simplification of maintenance and inspection. In addition, the feed level of the medium 30 to be processed by the second corrugating unit 42 may be made higher than that of the embodiment shown in FIG. 3. This means that the relative difference between the feed level of the medium 30 and that of the medium 30 to be processed by the first corrugating unit 36 may be made smaller. In this way, the relatively small difference between the feed levels of the mediums 30,30 to be fed to the first and the second corrugating units 34 and 42 respectively, may lead to the simplification of the machine structure associated with the medium feeding system, there being no undue force to be applied to the medium itself.

It should be noted that in the foregoing embodiments, the amount of travel of the moving components (i.e., the pressure roll 26 or the first corrugating unit 36 and the second corrugating unit 42) is small. Thus, the universal joint as described above will suffice for the purpose, that is, for connecting the pressure roll 26 or the lower roll 34(40) to the output shaft of the reduction gear 70. Further, for the piping system of steam for heating the pressure roll 26 and the upper and lower rolls, a flexible tubular body may conveniently be used.

The operation of the single facer machine of the invention will now be described. In the embodiment of FIGS. 2 to 5, when a single-faced corrugated board 48 is to be formed by the combination of the first corrugating unit 36 and the pressure roll 26, the pressure roll 26 is shifted to a position in which the linerboard 28, and the medium 30 to which adhesive has been applied, may be held under pressure between the pressure roll 26 and the lower roll 34 of the first corrugating unit 36. After the single-faced corrugated board 48 with a predetermined kind of flute (for example, A-flute) has been formed by the combination of the rolls as described above, and when it is desired to shift the mode of production into a different kind of flute (for example, E-flute), the pressure roll 26 is shifted to a position operative with the second corrugating unit 42. To this end, the speed reducers 66 of FIG. 4 are driven, causing the races 54 with the respective sector gears 54b to rotate in the through holes 56a of the levers 56. At this time, since the center 11 of the hole 54a of the race 54 is deviated a predetermined distance from the center 12 of the race outer peripheral surface 54c, the pressure roll 26 is eccentrically moved away from the lower roll 34 of the first corrugating unit 36 and toward the lower roll 40 of the first corrugating unit 42, as shown in FIG. 3. Then, the medium 30 is passed between the upper roll 38 and the lower roll 40 of the second corrugating unit 42 to make a desired kind of flute (for example, E-flute). The corrugated medium 30 is then glued on its flute tips by the glue mechanism 47 and is pressed against the linerboard fed over the pressure roll 26 to thereby form a single-faced corrugated board 48 with a kind of flute different from that formed by the first corrugated unit 36.

In the embodiment of FIGS. 10A and 10B, the same operation as above may be accomplished except that the arrangement for shifting the pressure roll 26 is different. Further, in the embodiment of FIGS. 11A and 11B, the hydraulic cylinder 82 is actuated to move the bracket 80 linearly, causing the upper and lower rolls 32 and 34 (38 and 40) to move toward and away from the stationary pressure roll 26. By means of this arrangement, the combination of the first corrugating unit 36 and the pressure roll 26 or the combination of the second corrugating unit 42 and the pressure roll 26 may be selectively shifted.

From what has been said, it will be apparent that the invention offers the possibility of readily dealing with the production of single-faced corrugated board with different kinds of flute. The apparatus of the invention basically comprises one set of single facer machine having additional upper and lower rolls, as opposed to the conventional tandem system which includes two sets of single facer machine having the same machine formation arranged in series. For this reason, the area of installation needed is only for one set of machine; the space may be efficiently utilized. In addition, since power transmission mechanisms, steam and hydraulic/pneumatic piping systems and other components may be used in common, the manufacturing cost may be minimized. Further, since the amount of displacement of the pressure roll or the corrugating units is considerably small, the associated support and drive mechanisms may conveniently be simple, requiring a relatively low degree of machining tolerances.

While the invention has been described with reference to preferred embodiments thereof, it is to be understood that modifications and variations may be easily made without departing from the spirit of this invention which is defined by the appended claims.

What is claimed is:

1. A machine for manufacturing one-sided corrugated board from a liner and a center sheet comprising:
    a first corrugating unit which comprises a pair of interlocked corrugating rolls for forming a required flute on the center sheet;
    a second corrugating unit which comprises a pair of interlocked corrugating rolls; and
    a single pressure roll for commonly working with either said first corrugating unit or said second corrugating unit, said pressure roll being selectively and relatively movable between a first operating position which enables it to glue the liner to said center sheet from the first corrugating unit and a second operating position which enables it to glue the liner to the center sheet from the second corrugating unit.

2. The machine as defined in claim 1 wherein positions of said first corrugating unit and said second corrugating unit are fixed, and wherein said pressure roll is selecively moved into contact with either the lower roll of said first corrugating unit or the lower roll of said second corrugating unit.

3. The machine as defined in claim 1 or 2 wherein said first corrugating unit and said second corrugating unit are arranged obliquely upwardly and obliquely downwardly, respectively, of said pressure roll.

4. The machine as defined in claim 1 or 2, wherein said first corrugating unit lies in a plane vertical to the axis of rotation of said pressure roll, and wherein said second corrugating unit lies in a plane horizontal to the axis of rotation of said pressure roll.

5. The machine as defined in claim 3 including glue mechanisms for said first corrugating unit and said second corrugating unit, respectively.

6. The machine as defined in claim 4 including glue mechanisms for said first corrugating unit and said second corrugating unit, respectively.

7. The machine according to claim 1 further characterized in that as said pressure roll moves between said first and second operating positions, said pressure roll passes through a zone located approximately between the first corrugating unit and the second corrugating unit.

8. A machine for manufacturing one-sided corrugated board from a liner and a center sheet comprising:
    a non-rotatable frame;
    a first corrugating unit supported by said frame and comprising interlocked corrugating rolls for forming a flute on said center sheet;
    a second corrugating unit supported by said frame and comprising interlocked corrugating rolls for forming a flute on said center sheet of a different size than said flute formed by said interlocked corrugating rolls of said first corrugating unit; and
    a single pressure roll supported by said frame adjacent said first and second corrugating units and parallel to said rolls of said first and second corrugating units, said single pressure roll being selectively and relatively movable into engagement with either said first or second corrugating units after passing through a zone located between said first and second corrugating units.

* * * * *